United States Patent
Pathak et al.

(10) Patent No.: US 11,048,042 B2
(45) Date of Patent: Jun. 29, 2021

(54) CURVED WAVEGUIDE CONFIGURATION TO SUPPRESS MODE CONVERSION

(71) Applicant: Lumentum Operations LLC, San Jose, CA (US)

(72) Inventors: Shibnath Pathak, San Jose, CA (US); Konstantin Petrovich Petrov, Sunnyvale, CA (US); Brian Daniel, San Diego, CA (US); Hossein Hodaei, San Jose, CA (US); Michael C. Larson, Oakland, CA (US); Amit Mizrahi, San Jose, CA (US)

(73) Assignee: Lumentum Operations LLC, San Jose, CA (US)

(*) Notice: Subject to any disclaimer, the term of this patent is extended or adjusted under 35 U.S.C. 154(b) by 0 days.

(21) Appl. No.: 16/730,527

(22) Filed: Dec. 30, 2019

(65) Prior Publication Data

US 2020/0310028 A1    Oct. 1, 2020

Related U.S. Application Data

(60) Provisional application No. 62/827,542, filed on Apr. 1, 2019, provisional application No. 62/903,464, filed on Sep. 20, 2019.

(51) Int. Cl.
*G02B 6/125* (2006.01)
*G02B 6/122* (2006.01)
*G02B 6/12* (2006.01)

(52) U.S. Cl.
CPC ......... *G02B 6/125* (2013.01); *G02B 6/12007* (2013.01); *G02B 6/1225* (2013.01); *G02B 2006/1204* (2013.01); *G02B 2006/12061* (2013.01); *G02B 2006/12078* (2013.01)

(58) Field of Classification Search
CPC .. G02B 6/125; G02B 6/12007; G02B 6/1225; G02B 2006/1204; G02B 2006/12061; G02B 2006/12078
See application file for complete search history.

(56) References Cited

U.S. PATENT DOCUMENTS

| | | | | |
|---|---|---|---|---|
| 5,943,457 A * | 8/1999 | Hayward | ............ | G02B 6/2861 372/6 |
| 6,067,391 A * | 5/2000 | Land | ................... | G02B 6/02085 385/27 |
| 6,201,910 B1 * | 3/2001 | Boschis | ............ | G02B 6/02085 385/123 |
| 8,634,684 B2 * | 1/2014 | Little | ..................... | G02B 6/105 385/32 |
| 9,128,241 B2 * | 9/2015 | Baets | ..................... | G02B 6/124 |
| 10,585,242 B1 * | 3/2020 | Brusberg | ............. | G02B 6/1221 |

(Continued)

OTHER PUBLICATIONS

Matteo Cherchi et al., "Dramatic size reduction of waveguide bends on a micron-scale silicon photonic platform", May 8, 2013, 10 pages.

(Continued)

*Primary Examiner* — Andrew Jordan
(74) *Attorney, Agent, or Firm* — Harrity & Harrity, LLP

(57) ABSTRACT

A photonic integrated circuit may include a substrate and an optical waveguide integrated with the substrate. The optical waveguide may include a bend section, wherein a bend shape of the bend section is defined by a curvature function to suppress waveguide mode conversion.

20 Claims, 10 Drawing Sheets

(56) References Cited

U.S. PATENT DOCUMENTS

| | | | | |
|---|---|---|---|---|
| 2001/0024547 | A1* | 9/2001 | Huang | G02B 6/125 |
| | | | | 385/32 |
| 2015/0277042 | A1 | 10/2015 | Goodwill et al. | |
| 2020/0166702 | A1* | 5/2020 | Jacob | G02B 6/125 |
| 2020/0310028 | A1* | 10/2020 | Pathak | G02B 6/1225 |

OTHER PUBLICATIONS

Daoxin Dai, "Silicon nanophotonic integrated devices for networks-on-chip: multiplexing and switching", 2015, 3 pages.

Lucas H. Gabrielli et al., "On-chip transformation optics for multimode waveguide bends", Jul. 20, 2012, 6 pages.

K. R. Hiremath et al., "Analytic approach to dielectric optical bent slab waveguides", Jun. 18, 2004, 16 pages.

Xiaohui Jiang et al., "Low-loss and low-crosstalk multimode waveguide bend on silicon", Jun. 25, 2019, 10 pages.

Masaki Kohtoku et al., "Control of Higher Order Leaky Modes in Deep-Ridge Waveguides and Application to Low-Crosstalk Arrayed Waveguide Gratings", Feb. 2, 2004, 10 pages.

Xin Tu et al., "Compact low-loss adiabatic bends in silicon shallow-etched waveguides", 2016, 2 pages.

Wikipedia, "Window function", https://en.wikipedia.org/wiki/Window_function, Dec. 25, 2019, 17 pages.

* cited by examiner

CURVED WAVEGUIDE CONFIGURATION TO SUPPRESS MODE CONVERSION

RELATED APPLICATION(S)

This application claims priority to U.S. Provisional Patent Application No. 62/827,542, filed on Apr. 1, 2019, and entitled, "WAVEGUIDE BENDS FOR REDUCED MODE CONVERSION," the content of which is incorporated by reference herein in its entirety.

This application claims priority to U.S. Provisional Patent Application No. 62/903,464, filed on Sep. 20, 2019, and entitled "WAVEGUIDE BENDS FOR REDUCED MODE CONVERSION," the content of which is incorporated by reference herein in its entirety.

TECHNICAL FIELD

The present disclosure relates generally to a waveguide bend configuration and to a waveguide with a bend section that is defined by a curvature function to suppress waveguide mode conversion.

BACKGROUND

Coupling light between optical components may be achieved using a waveguide. A waveguide can be fabricated on and/or in a photonic integrated circuit, and can be used for efficient coupling or routing. Approaches for designing a photonic integrated circuit include using an indium phosphide (InP) photonic integrated circuit or a silicon photonic integrated circuit. Waveguide bends may be incorporated into waveguides integrated with the photonic integrated circuit to enable coupling of optical components at high densities and with complex layouts. Some waveguides may support multiple propagating modes. In such cases, a bend curvature of a waveguide bend may result in coupling into higher order modes, which may cause negative impacts to circuit elements downstream from the waveguide bend (e.g., downstream with respect to a transmission of optical signals through the waveguide bend).

SUMMARY

According to some possible implementations, a photonic integrated circuit may include a substrate and an optical waveguide integrated with the substrate. The optical waveguide may include a bend section, wherein a bend shape of the bend section is defined by a curvature function to suppress waveguide mode conversion.

According to some possible implementations, an integrated optical waveguide may include a first section with a first orientation, a second section with a second orientation, and a bend section to couple the first section to the second section. A bend shape of the bend section may be defined by a curvature function to suppress waveguide mode conversion to higher order modes.

According to some possible implementations, a multiplexing/demultiplexing device includes a substrate with an integrated optical waveguide. The integrated optical waveguide may include a first section with a first orientation, one or more second sections with one or more second orientations, and one or more bend sections to couple the first section to the one or more second sections. One or more bend shapes of the one or more bend sections may be defined by one or more functions that exhibit side lobe suppression in Fourier space.

DETAILED DESCRIPTION

Figures 1B, 1C:
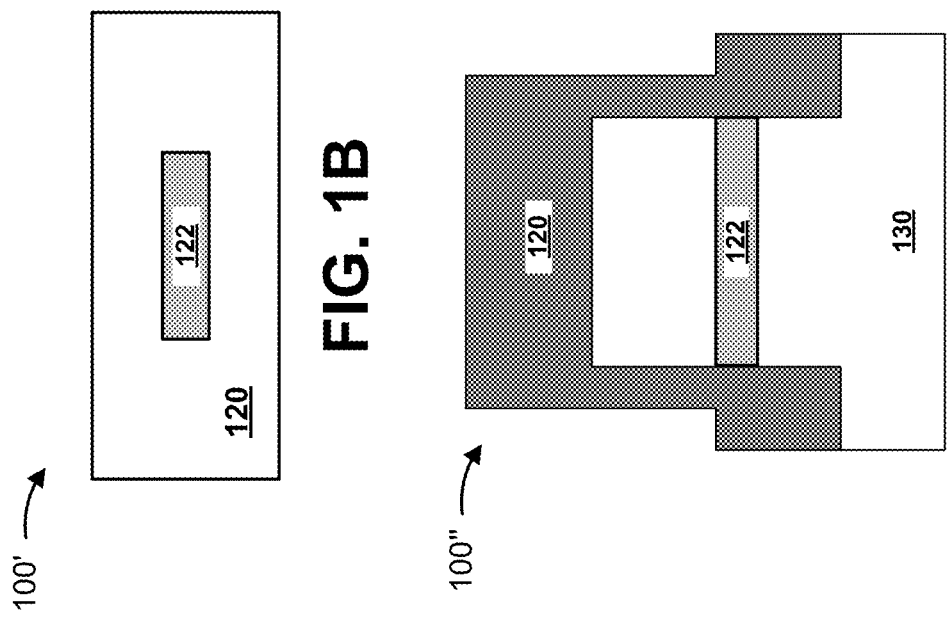
FIGS. 1A-1C are diagrams of one or more example implementations described herein.

The following detailed description of example implementations refers to the accompanying drawings. The same reference numbers in different drawings may identify the same or similar elements.

In a photonic integrated circuit, such as for coherent transmission in an optical communication system, a waveguide bend may be used to couple optical components of the photonic integrated circuit. For example, a first optical component may couple to a first end of a waveguide with a first orientation and a second optical component may couple to a second end of the waveguide with a second orientation. A bend section, disposed between ends of the waveguide, may transition the waveguide from the first orientation to the second orientation. For example, the bend section may enable a 90 degree change of orientation, a 180 degree change of orientation, an S-bend (e.g., multiple changes of orientation resulting in a net-zero degree change in orientation), or any other change of orientation. Some photonic integrated circuits may include waveguides with a bend section that has a circular curvature.

As light propagates through the circular curvature bend section, coupling may occur between multiple propagating modes, which may result in a performance degradation. For example, in a Mach-Zehnder (MZ) modulator, an extinction ratio may drop when a higher order mode travels through a multi-mode interference (MMI) splitter or combiner of the MZ modulator. Mode coupling may be reduced by increasing a radius of the bend section, which reduces a local curvature of the bend section. However, increasing the radius of the bend section may result in increasing an overall size of the bend section. Another technique for managing coupling may be an addition of a 1×1 MMI to provide some filtering of the higher order modes. Increasing a radius of the bend section or adding a 1×1 MMI may result in an increase to the size of the photonic integrated circuit and may result in additional optical power loss. However, with increasing densities of optical components to provide improved throughput in optical communications systems, it may be desirable to reduce a size of a photonic integrated circuit and/or a waveguide thereof without negatively impacting mode coupling.

Some implementations described herein provide a waveguide bend configuration to enable waveguide bends with reduced mode coupling relative to other waveguide configurations. For example, a photonic integrated circuit may include an optical waveguide integrated with a substrate and including a bend section with a bend shape defined by a curvature function. In this case, the curvature function may be a sinusoidal function of the form $a*\sin^n(b*s)$, where a and b are configurable constants, n is a value>0, and s represents a path length along the bend section. Additionally, or alternatively, the curvature function may be another type of function, such as a Dolph-Chebyshev function, a piecewise-defined function, a continuous function, a window function (e.g., a function that is zero-valued outside of an interval, at a maximum at approximately a midpoint between ends of the interval, and with a tapered shape between the ends of the interval and the midpoint), such as a signal processing or spectral analysis type of window function, and/or the like. In this way, the bend section may suppress waveguide mode conversion relative to using a circular curvature function or other types of waveguide bend shapes. Based on suppressing waveguide mode conversion, the photonic integrated circuit may achieve improved performance and/or reduced form factor relative to using a circular curvature function, integrating a 1×1 MMI to filter mode coupling, and/or the like. For example, for a III-V waveguide, switching from a circular curvature function to a $\sin^4$ curvature function for a waveguide bend geometry may achieve an improvement of, for example, 60 decibels (dB) in waveguide mode conversion. Although some implementations are described herein in terms of integer multiples of n, other values of n may be possible.

Figure 1A:
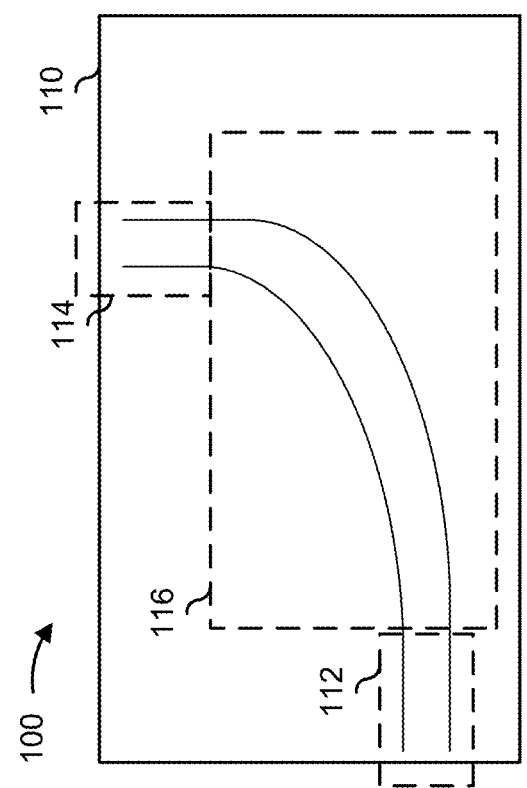

FIGS. 1A-1C is a diagram of one or more example implementations 100/100'/100" described herein.

As shown in FIG. 1A, and in example implementation 100, a photonic integrated circuit 110 may include a waveguide integrated with a substrate. As shown in FIG. 1C, in some implementations, the waveguide may be a deep etch III-V waveguide disposed on the substrate. For example, the waveguide may be an approximately 3 micrometer (μm) tall waveguide with a high refractive index core of thickness of about 0.5 micrometer (um), that achieves a relatively low level of loss. Additionally, or alternatively, as shown in FIG. 1B, the waveguide may be associated with another material system and/or another core thickness, such as a thickness of between 100 nanometers (nm) and 500 nm, between 200 nm and 400 nm, approximately 220 nm, and/or the like. Additionally, or alternatively, the waveguide may be associated with other material system and/or another core thicknesses. Additionally, or alternatively, the waveguide may be integrated at least partially into the substrate.

Returning to FIG. 1A, the waveguide may include a first section 112 with a first orientation and a second section 114 with a second orientation. For example, a first end of the waveguide in first section 112 may couple to a first component of photonic integrated circuit 110 and a second end of the waveguide in second section 114 may couple to a second component of photonic integrated circuit 110. In this case, the first and second components coupled to the waveguide may include an integrated optical element, such as a combiner, a splitter, a modulator, an amplifier, a wavelength multiplexer, a wavelength demultiplexer, a mode multiplexer, a mode demultiplexer, a polarization multiplexer, a polarization demultiplexer, an input port, an output port, and/or the like. For example, the waveguide may be a part of a multiplexer/demultiplexer optical device integrated with a photonic integrated circuit. In some implementations, bend section 116 may couple to another optical element that is not on the same substrate as bend section 116. In some implementations, bend section 116 may couple to another bend section (e.g., with the same or a different bend configuration). In some implementations, bend section 116 may couple to another component without an intervening straight first section or second section.

In some implementations, the waveguide may be a 1×1 (1 input, 1 output) waveguide. For example, the waveguide may have a single first section 112 and a single second section 114. Additionally, or alternatively, the waveguide may be a 1×L (L>1), such as a 1×2, waveguide. For example, the waveguide may have a single first section 112 and multiple second sections 114 (e.g., coupled to a single bend section 116 with a split therein, coupled to a single bend section 116 with a split after bend section 116). The waveguide may also be a L×1 waveguide (L>1) such as a 2×1 coupled to respective bend sections 116 after a split in first section 112. A 1×2 waveguide may be implemented with a 1×2 MMI on a photonic integrated circuit. For example, the 1×2 waveguide may include a bend section with a first end with a first orientation to receive an optical signal, a second end with a second orientation to output the optical signal for a first branch of the 1×2 MMI and a third end with a third orientation to output the optical signal for a second branch of the 1×2 MMI. In this case, the second and third orientations may be the same or different orientations. In some implementations, the second end and the third end may be respective bend sections defined by the same curvature function or by different curvature functions resulting in different bend shapes (e.g., the second end may be associated with a bend section defined by a $\sin^2$ curvature function and the third end may be associated with a bend section defined by a $\sin^3$ curvature function). Additionally, or alternatively, other waveguide structures (e.g., Y-splitters, directional couplers) may be used to form a 1×2 optical device.

As further shown in FIG. 1A, a bend section 116 may couple the first section and the second section, thereby transitioning the waveguide from the first orientation at the first section to the second orientation at the second section. For example, bend section 116 may include a portion of the waveguide with a bend shape defined by a curvature function, such as a sinusoidal function (e.g., a sine function), a Dolph-Chebyshev function, a piecewise function, a Fourier approximation of a curvature function, another type of approximation of a curvature function, and/or the like. A first order mode and a second order mode may be represented by a set of coupled-mode equations:

$$\frac{dA}{ds} = k_0 C(s) B e^{-j\Delta\beta s} \quad (1)$$

$$\frac{dB}{ds} = k_0^* C(s) A e^{j\Delta\beta s} \quad (2)$$

where A represents the second order mode (e.g., that is to be suppressed), B represents the first order mode, $k_0$ represents a coupling coefficient relating to a waveguide cross-section, $C(s)$ represents a curvature along a path length, s, of the waveguide, and $\Delta\beta$ represents a difference in wave number between the two modes. For a case where the undesirable second order mode is well-suppressed, we can assume B~1 meaning the amplitude of the fundamental mode is hardly impacted. Then equation (1) may be integrated to yield a Fourier transform approximation of the form:

$$A \sim k_0 \int_0^{s_{max}} ds\, C(s) e^{-j\Delta\beta s} \quad (3)$$

In this case, the curvature function may be selected, such that the curvature function exhibits strong side lobe suppression in Fourier space (e.g., relative to, for example, a constant curvature function), which may result in suppression of the second order mode.

For example, the curvature function may be derived from determining that the curvature function achieves a threshold side lobe suppression in Fourier space. For example, the side-lobe suppression may be 100 decibels (dB) relative to a main lobe. Additionally, or alternatively, the side-lobe suppression may be greater than 10 dB, greater than 20 dB, greater than 50 dB, greater than 75 dB, greater than 100 dB, and/or the like relative to the main lobe. In this way, the waveguide may suppress higher order modes relative to other curvature shapes, such as a constant curvature (which may also be termed a circular curvature), an Euler curvature, and/or the like, as described in more detail herein. For example, the waveguide may suppress inter-mode crosstalk by greater than a threshold percentage, such as greater than 30 dB, greater than 50 dB relative to the constant curvature case, and/or the like. Furthermore, when multiple modes are used to increase channel capacity (e.g., in mode-division multiplexing scenarios), using such waveguide bends may reduce coupling between the multiple modes.

As shown in FIG. 1B, and by example implementation 100' of a silicon waveguide, a first cross section of the waveguide includes a low index material 120 surrounding a high index material 122. For example, low index material 120 may be a silicon dioxide structure (e.g., with a refractive index of 1.45). In some implementations, high index material 122 may be a silicon structure (e.g., with a refractive index of 3.48). In some implementations, a cross section of the waveguide may be a rectangular cross-section. In some implementations, high index material 122 may be a doped high index silicon material, a set of multiple quantum wells (MQWs), a bulk quaternary semiconductor, and/or the like. Although some implementations are described herein in terms of a particular set of materials, such as silicon dioxide and silicon, other possible high index and/or low index materials may be selected. Additionally, or alternatively, other configurations of a waveguide may be possible, such as a waveguide with additional layers, a different cross-section, and/or the like.

In contrast, as shown in FIG. 1C, and by example implementation 100" of an indium phosphide waveguide, rather than low index material 120 surrounding the high index material 122, low index material 120 (e.g., with a refractive index of 1.45) may partially surround high index material 122 (e.g., with a refractive index of 3.39) and high index material 130 may partially surround low index material 120. In this case, high index material 130 may be an indium phosphide (InP) material (e.g., with a refractive index of 3.18).

Other examples of waveguides may include silicon nitride waveguides, gallium arsenide waveguides, polymer waveguides, semiconductor waveguides, lithium niobate waveguides, silica waveguides, and/or the like. In some implementations, the waveguide may be deep etched, as shown in FIG. 1C, or shallow etched. In another example, the waveguide may have a higher index material top and bottom cladding and a lower index material side cladding. By using a curvature function described herein for geometry of the waveguide bend, higher order modes are suppressed, thereby improving performance of the waveguide and/or components coupled thereto.

As indicated above, FIGS. 1A-1C are provided merely as one or more examples. Other examples may differ from what is described with regard to FIGS. 1A-1C.

FIGS. 2A-2E are diagrams illustrating example physical and optical characteristics of a waveguide bend described herein.

Figure 2A:
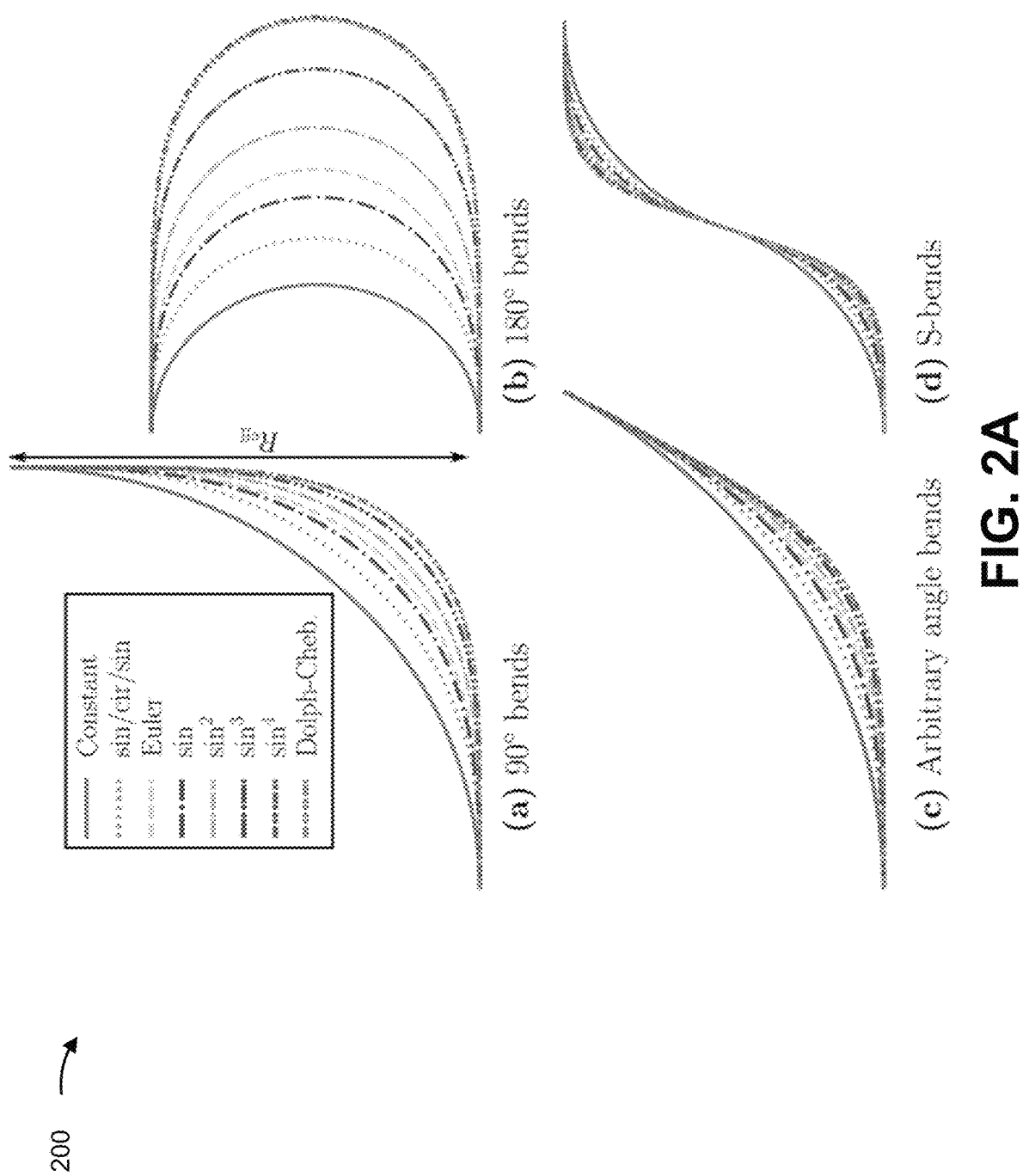
FIGS. 2A-2E are diagrams of physical and optical characteristics of one or more example implementations described herein.
Figure 2B:
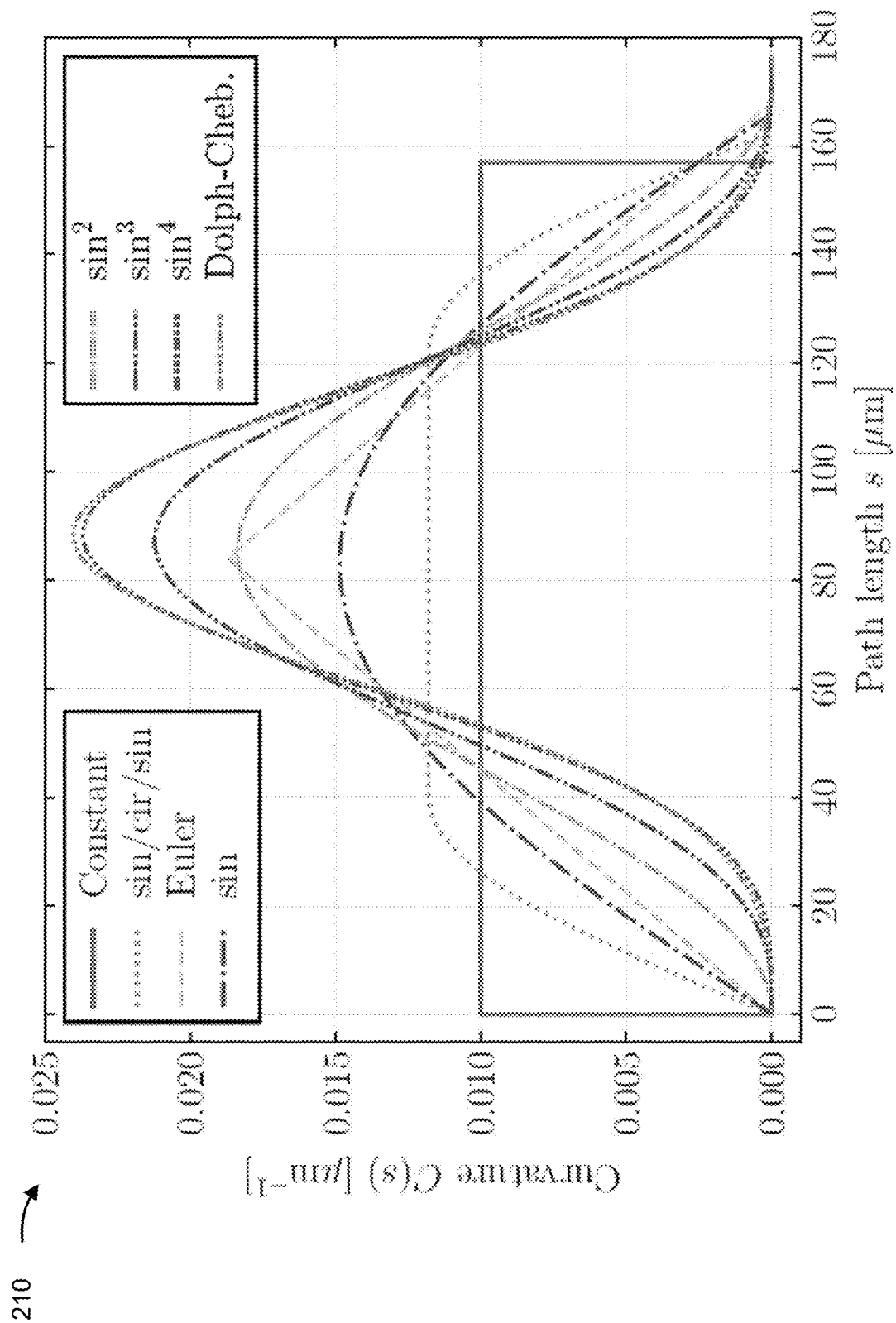

As shown in FIG. 2A, and by diagram 200, different curvature functions may be possible for a waveguide, such as the waveguide of FIGS. 1A-1C. For example, the waveguide may have a mixed curvature function (e.g., a non-continuous curvature function that is a sinusoidal (sin) function for a first portion of a bend section, a constant or circular (cir) curvature function for a second portion of the bend section, and a sinusoidal function for a third portion of the bend section). Similarly, the waveguide may have an Euler curvature function, a $sin^1$ curvature function, a $sin^2$ curvature function, a $sin^3$ curvature function, a $sin^4$ curvature function, a Dolph-Chebyshev (Dolph-Cheb.) curvature function, and/or the like. Curvature functions, such as sine, may define a waveguide that performs better, across effective radiuses, $R_{eff}$, than, for example, a constant curvature. As shown in FIG. 2B, and by diagram 210, the higher order sinusoidal curvature functions and the Dolph-Chebyshev function may have a different physical curvature along a path length of a bend section.

Figure 2C:
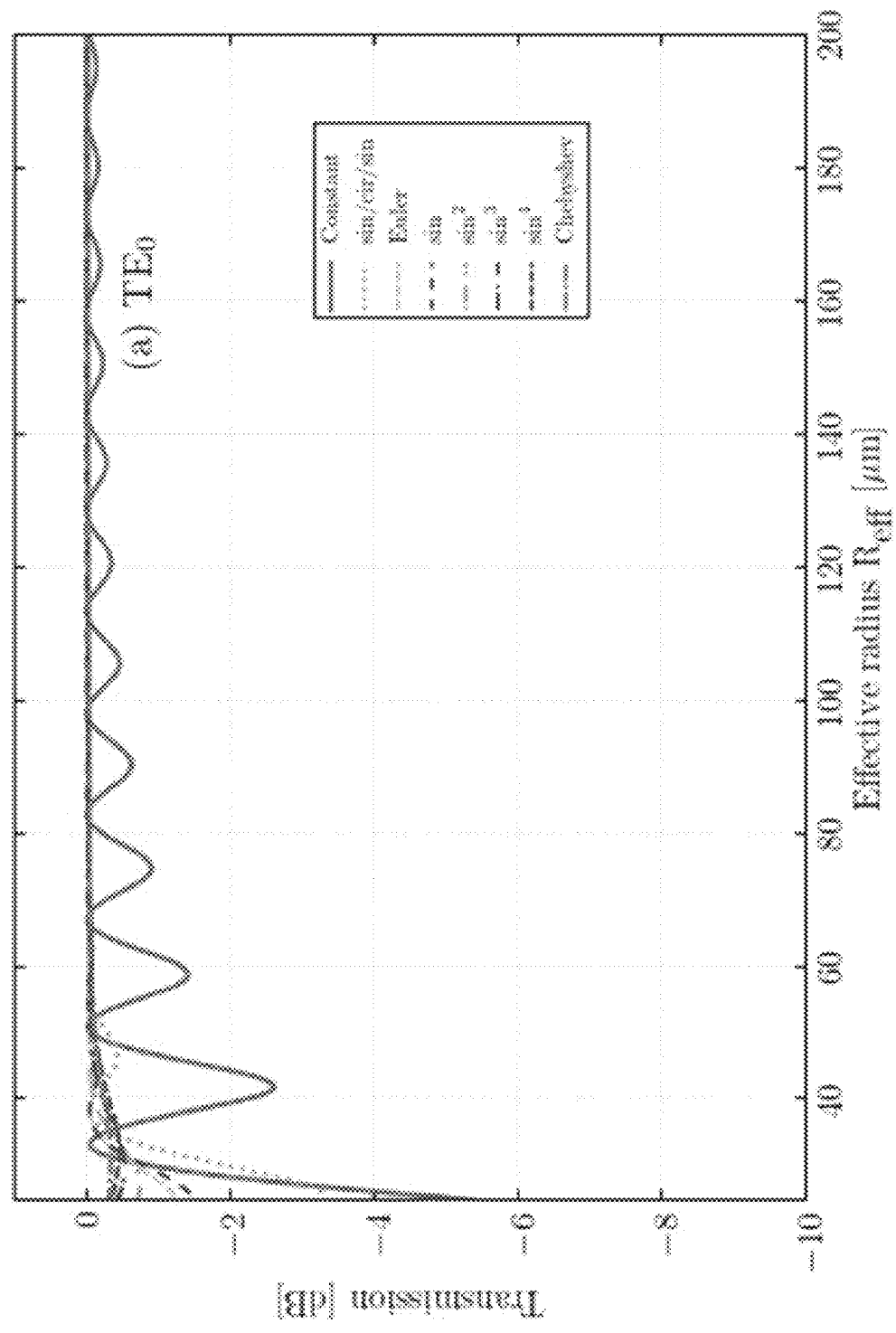
Figure 2D:
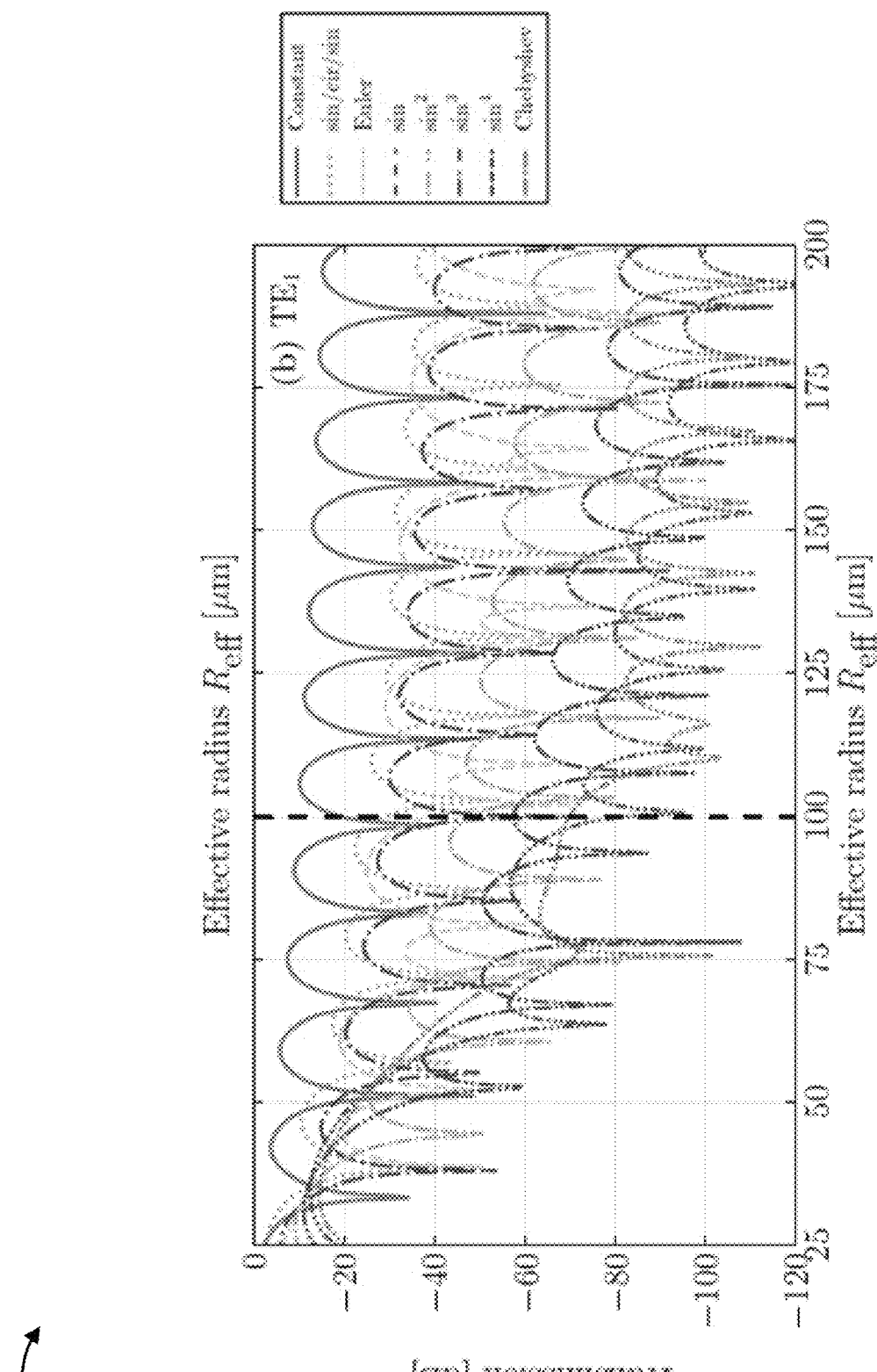
Figure 2E:
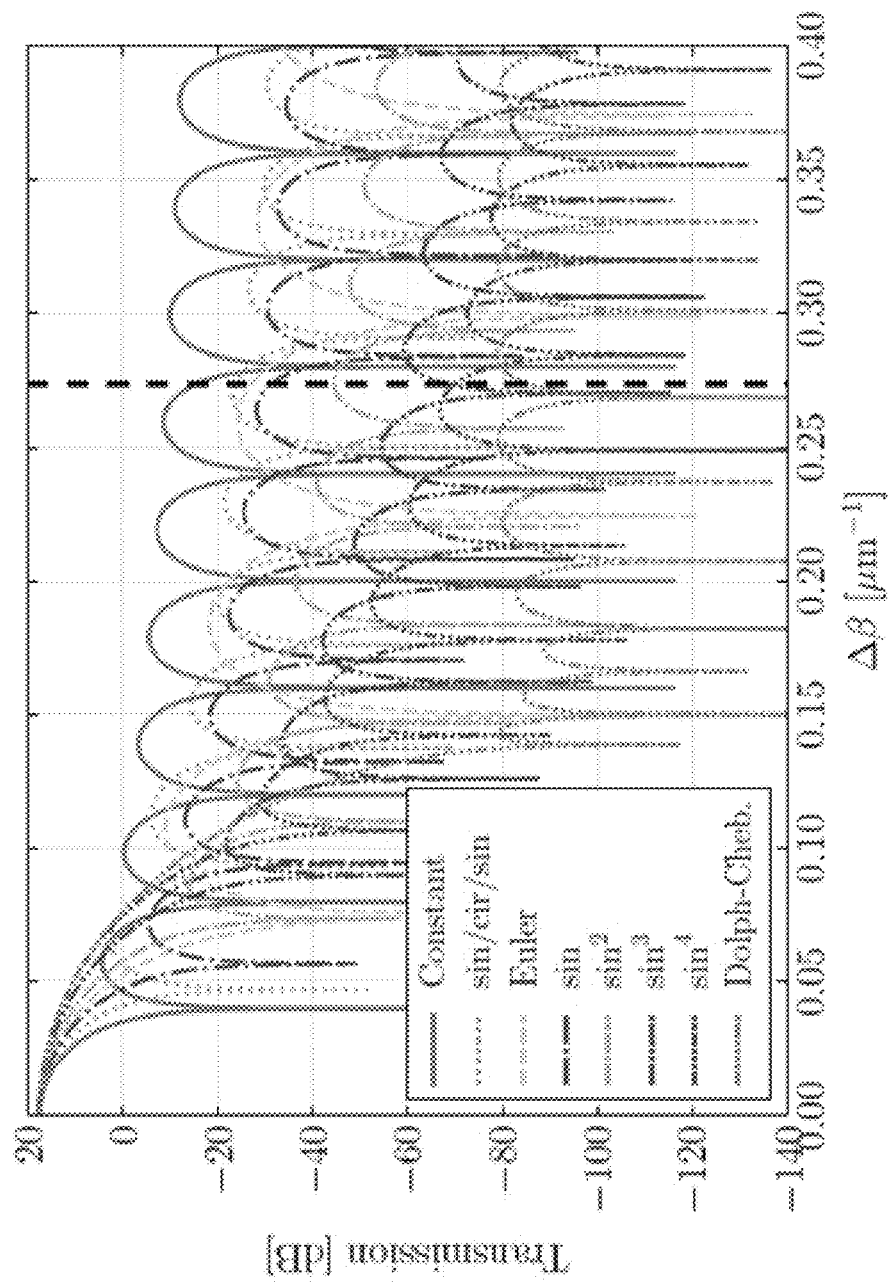

In this case, by shaping the curvature of the waveguide, the bend sections defined by the aforementioned curvature functions (e.g., $sin^2$, $sin^3$, $sin^4$, Dolph-Chebyshev, and/or the like) suppress higher order modes, thereby improving performance of, for example, optical components of a photonic integrated circuit. For example, calculated values of transmission for 90 degree bend in an indium phosphide waveguide with a width of 2 micrometers (μm) and at a wavelength of 1550 nanometers (nm) are shown in FIG. 2C, and by diagram 220. The aforementioned curvature functions achieve an increased transmission of the transverse electric mode ($TE_0$) across different effective radii for a waveguide (e.g., relative to a constant curvature function). Further, as shown in FIGS. 2D and 2E, in physical space and Fourier space, respectively, the aforementioned curvature functions achieve a decreased $TE_1$ mode coupling across different effective radii (e.g., relative to a constant curvature function). In this way, the higher order sinusoidal curvature functions and Dolph-Chebyshev function suppress higher order modes (e.g., $TE_1$), thereby improving performance for transmission of lower order modes (e.g., $TE_0$).

As indicated above, FIGS. 2A-2E are provided merely as one or more examples. Other examples may differ from what is described with regard to FIGS. 2A-2E.

Figure 3A:
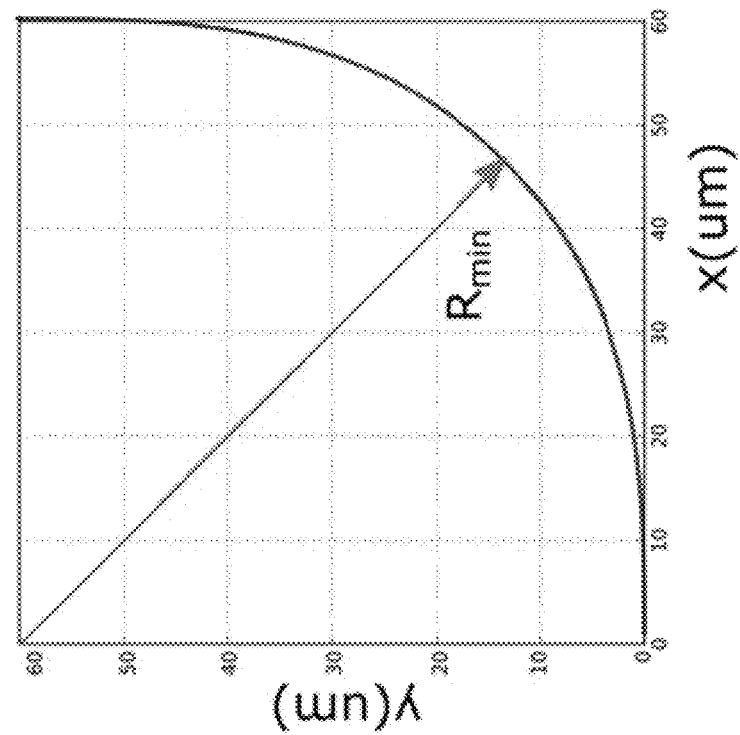
FIGS. 3A and 3B are diagrams of physical characteristics of one or more example implementations described herein.
Figure 3A:
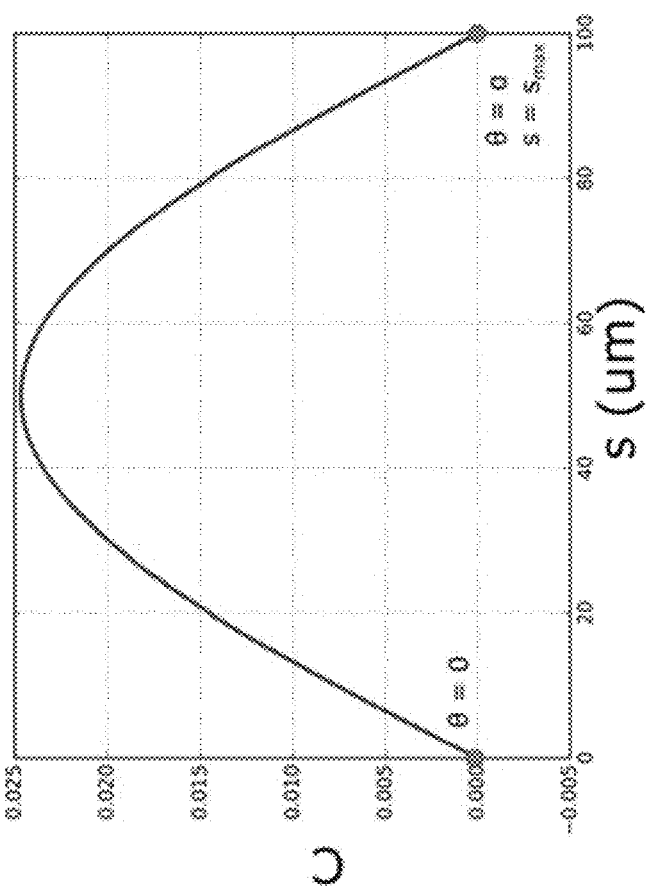
Figure 3B:
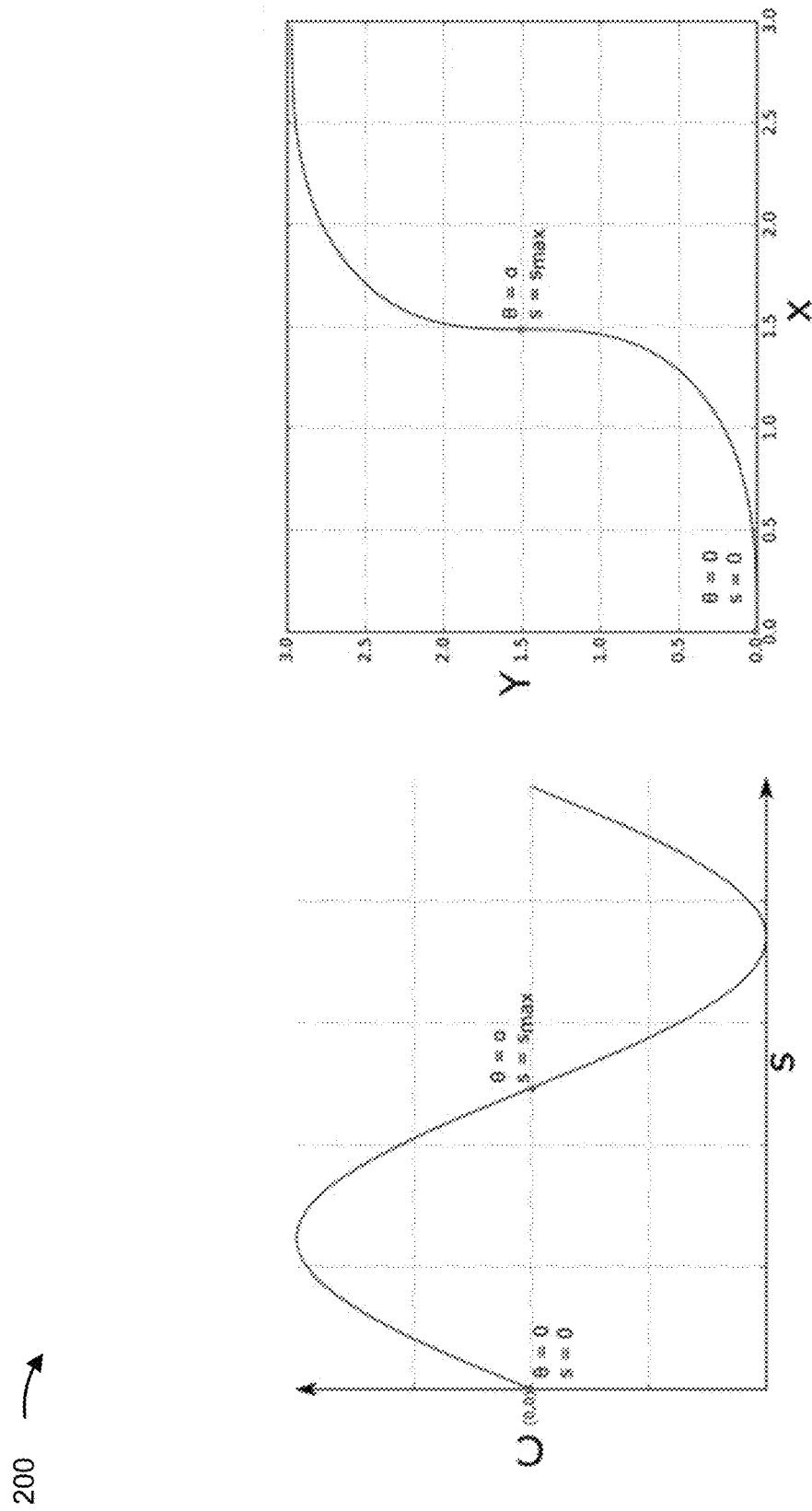

FIGS. 3A and 3B are diagrams illustrating example physical characteristics of a waveguide bend described herein.

FIGS. 3A and 3B show example graphs of a curvature equation, for a 90 degree change in orientation and a 180 degree (s-bend) change in orientation, respectively, of the form:

$$c = \frac{d\theta(s)}{ds} \quad (4)$$

where C represents the curvature, s represents a path length along a bend section, and θ(s) represents an angle of the slope of the curvature. In this case, the curvature equation may follow a set of conditions for some waveguides:

$$C=0, \theta=\theta_{start} \text{ at } s=0 \quad (5)$$

$$C=0, \theta=\theta_{start}+\alpha \text{ at } s=s_{max} \quad (6)$$

where α represents a change in orientation of the waveguide in the bend section from a first orientation at s=0 to a second orientation at s=$s_{max}$. As further shown in FIGS. 3A and 3B, in cartesian space, the curvature equation can be represented by a set of equations:

$$x(s)=\int_0^s \cos(\theta(s'))ds' \quad (7)$$

$$y(s)=\int_0^s \sin(\theta(s'))ds' \quad (8)$$

Using these equations, as an illustrative example, $sin^n$ where n=1, which is a sinusoidal curvature equation, may be represented as:

$$C = \frac{d\theta(s)}{ds} = a\sin(bs) \quad (9)$$

$$b = \frac{\pi}{s_{max}} \quad (10)$$

$$\theta(s) = \frac{\alpha}{2}\left[1 - \cos\left(\frac{\pi s}{s_{max}}\right)\right] \quad (11)$$

$$\psi = s/s_{max} \quad (12)$$

As a result, in cartesian space, the sinusoidal curvature equation may be represented as:

$$x1(\psi) = \int_0^\psi \cos\left[\frac{\alpha}{2}(1 - \cos(\pi\psi'))\right]d\psi' = x(s)/s_{max} \quad (13)$$

$$y1(\psi) = \int_0^\psi \sin\left[\frac{\alpha}{2}(1 - \cos(\pi\psi'))\right]d\psi' = y(s)/s_{max} \quad (14)$$

$$x1_{max} = \int_0^1 \cos\left[\frac{\alpha}{2}(1 - \cos(\pi\psi'))\right]d\psi' = \cos\left(\frac{\alpha}{2}\right)J_0\left(\frac{\alpha}{2}\right) \quad (15)$$

$$y1_{max} = \int_0^1 \sin\left[\frac{\alpha}{2}(1 - \cos(\pi\psi'))\right]d\psi' = \sin\left(\frac{\alpha}{2}\right)J_0\left(\frac{\alpha}{2}\right) \quad (16)$$

where $J_0$ is a zero order Bessel function of the first kind, and equations 15 and 16 represent a size factor for the curvature functions of equations 12 and 13. Other sinusoidal curvature functions may be similarly represented as:

$$C = \frac{d\theta(s)}{ds} = a\sin^n(bs) \quad (17)$$

where n is an order of the sinusoidal curvature function, such as 2, 2.5, 3, 4, and/or the like.

As indicated above, FIGS. 3A and 3B are provided merely as one or more examples. Other examples may differ from what is described with regard to FIGS. 3A and 3B.

Figure 4A:
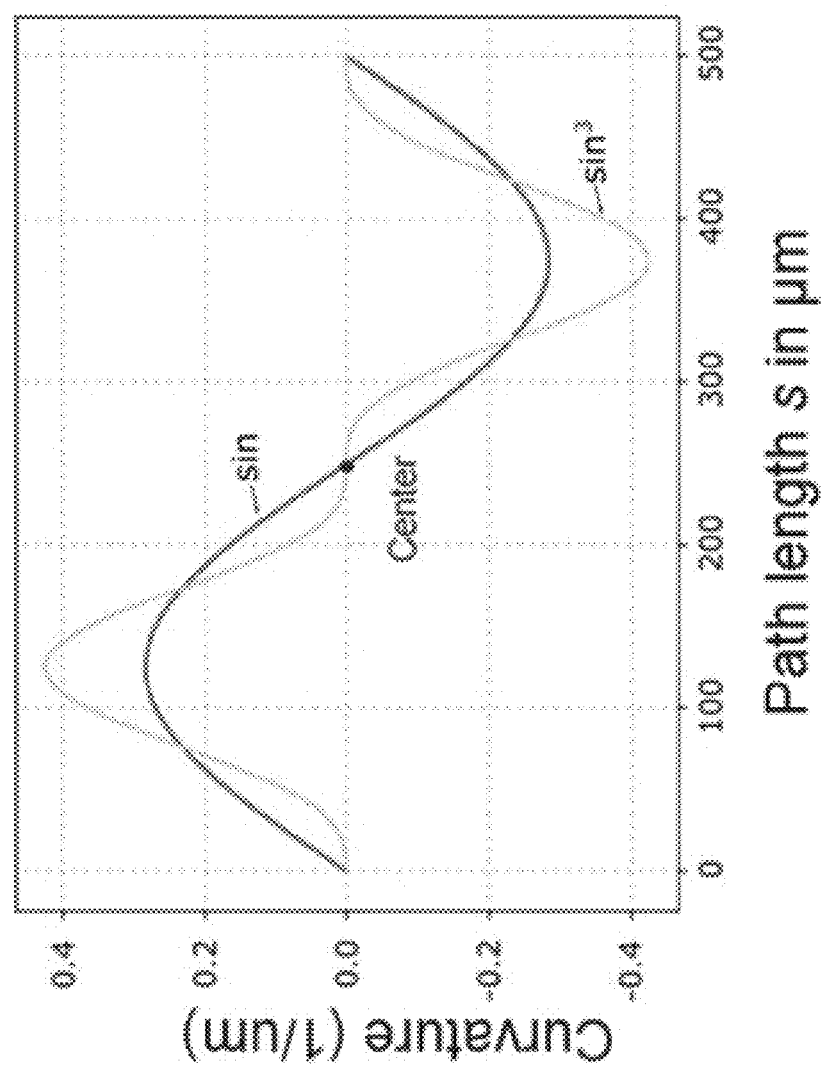
FIGS. 4A and 4B are diagrams of physical characteristics of one or more example implementations described herein.
Figure 4B:
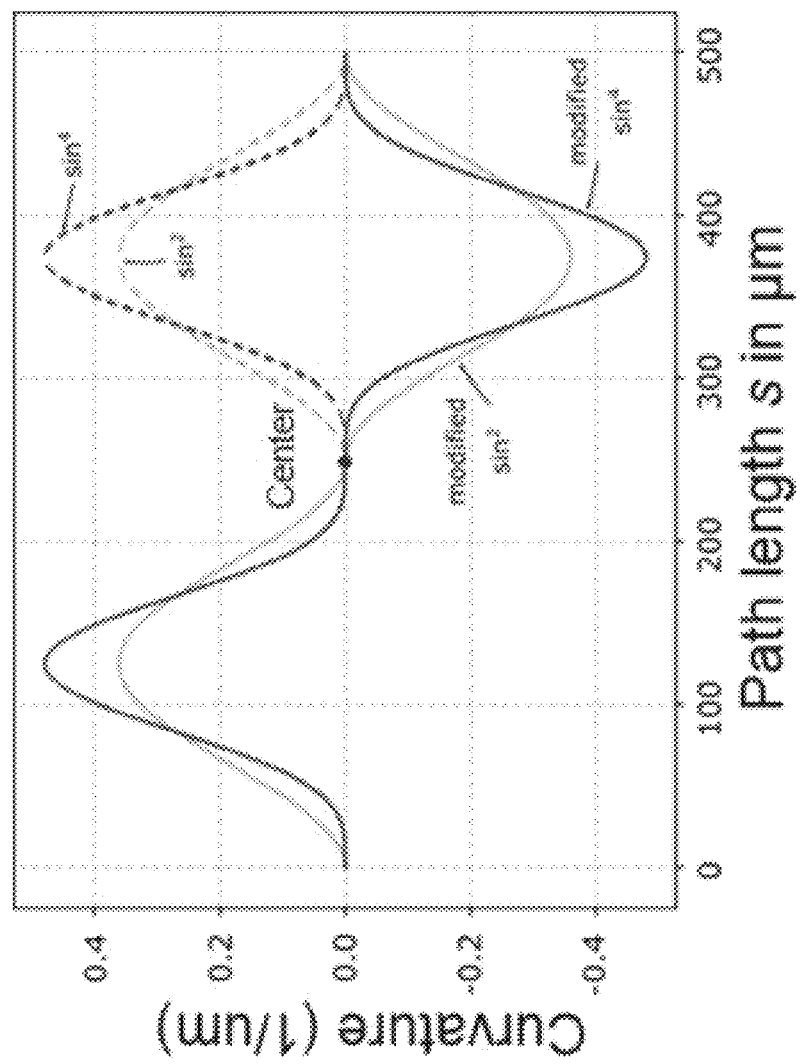

FIGS. 4A and 4B are diagrams illustrating example optical characteristics of a waveguide bend described herein.

As shown in FIG. 4A, for an odd power sinusoidal curvature function-defined waveguide bend, an S-bend may be achieved by a continuous sinusoidal curvature. For example, at a centerpoint of the sinusoidal curve of a $\sin^1$ or $\sin^3$ function, the function becomes negative resulting in creation of the S-bend. In contrast, as shown in FIG. 4B, for an even power sinusoidal curvature function-defined waveguide bend, an S-bend is achieved by a piecewise sinusoidal curvature. In this case, a first portion of the waveguide bend is defined by the even power sinusoidal curvature function (e.g., $\sin^2$, $\sin^4$, and/or the like) and a second portion of the waveguide bend is defined by the negative of the even power sinusoidal curvature function (e.g., a modified sinusoidal function), as shown.

As indicated above, FIGS. 4A and 4B are provided merely as one or more examples. Other examples may differ from what is described with regard to FIGS. 4A and 4B.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A photonic integrated circuit, comprising:
   a substrate;
   a first section, associated with a first optical component, with a first orientation;
   a second section, associated with a second optical component, with a second orientation; and
   an optical waveguide integrated with the substrate, the optical waveguide comprising:
      a bend section coupling the first section to a first end of the bend section and coupling the second section to a second end of the bend section,
      wherein a bend shape of the bend section, between the first end and the second end, has a continuous curvature that transitions the optical waveguide from the first orientation to the second orientation, and
      wherein the continuous curvature is defined by a curvature function to suppress waveguide mode conversion, wherein the curvature function is:
         a $\sin^1$ curvature function,
         a $\sin^2$ curvature function,
         a $\sin^3$ curvature function,
         a $\sin^4$ curvature function, or
         a Dolph-Chebyshev curvature function.

2. The photonic integrated circuit of claim 1, wherein the optical waveguide is at least one of:
   a silicon waveguide,
   an indium phosphide waveguide,
   a silicon nitride waveguide,
   a gallium arsenide waveguide,
   a polymer waveguide,
   a semiconductor waveguide,
   a lithium niobate waveguide, or
   a silica waveguide.

3. The photonic integrated circuit of claim 1, wherein the bend section forms an S-bend to couple the first section to the second section.

4. The photonic integrated circuit of claim 1, further comprising at least one integrated optical element.

5. The photonic integrated circuit of claim 4, wherein the at least one integrated optical element includes at least one of:
   a combiner,
   a splitter,
   a modulator,
   a wavelength multiplexer,
   a wavelength demultiplexer,
   a mode multiplexer,
   a mode demultiplexer,
   a polarization multiplexer, or
   a polarization demultiplexer.

6. The photonic integrated circuit of claim 1, wherein the bend shape comprises a silicon dioxide structure surrounding a silicon structure.

7. The photonic integrated circuit of claim 1, wherein the bend shape comprises a silicone dioxide structure partially surrounding an indium phosphide material structure.

8. An integrated optical waveguide, comprising:
   a first section, associated with a first optical component, with a first orientation;
   a second section, associated with a second optical component, with a second orientation; and
   a bend section to couple the first section to the second section,
      wherein a bend shape of the bend section, between a first end of the bend section and a second end of the bend section, has a continuous curvature that transitions the integrated optical waveguide from the first orientation to the second orientation, and
      wherein the continuous curvature is defined by a curvature function to suppress waveguide mode conversion to higher order modes, wherein the curvature function is:
         a $\sin^1$ curvature function,
         a $\sin^2$ curvature function,
         a $\sin^3$ curvature function,
         a $\sin^4$ curvature function, or
         a Dolph-Chebyshev curvature function.

9. The integrated optical waveguide of claim 8, wherein an angle between the first orientation and the second orientation is one of:
   30 degrees,
   45 degrees,
   90 degrees, or
   180 degrees.

10. The integrated optical waveguide of claim 8, wherein the curvature function is a $a*\sin^n(b*s)$ function where n>0, s represents a path length along the bend section, and a and b are constants.

11. The integrated optical waveguide of claim 8, wherein the curvature function is the Dolph-Chebyshev curvature function.

12. The integrated optical waveguide of claim 8, wherein the curvature function is a piecewise function.

13. The integrated optical waveguide of claim 8, wherein the curvature function is derived from a side lobe suppressed function in Fourier space.

14. The integrated optical waveguide of claim 8, wherein the bend shape is characterized by a side lobe suppression of a Fourier transform of the curvature function and the side lobe suppression of the Fourier transform is less than a threshold value.

15. The integrated optical waveguide of claim 8, wherein the first orientation is different from the second orientation.

16. The integrated optical waveguide of claim 8, further comprising:
   a third section with a third orientation; and
   another bend section to couple the first section to the third section,
      wherein another bend shape of the other bend section is defined by another curvature function to suppress waveguide mode conversion in higher order modes.

17. A multiplexing/demultiplexing device, comprising:
   a substrate with an integrated optical waveguide,
   the integrated optical waveguide, comprising:
      a first section with a first orientation,
      two or more second sections with two or more second orientations,
      two or more bend sections to couple the first section to the two or more second sections,
         wherein two or more bend shapes of the two or more bend sections, between the first section and the two or more second sections, each have a corresponding continuous curvature that transitions the integrated optical waveguide from the first orientation to a corresponding second orientation, and
         wherein each corresponding continuous curvature is defined by one or more functions that exhibit side lobe suppression in Fourier space, the one or more functions comprising at least one of:
            a $\sin^1$ curvature function,
            a $\sin^2$ curvature function,
            a $\sin^3$ curvature function,
            a $\sin^4$ curvature function, or
            a Dolph-Chebyshev curvature function.

18. The multiplexing/demultiplexing device of claim 17, wherein the two or more bend sections include a plurality of bend sections with a common bend shape.

19. The multiplexing/demultiplexing device of claim 17, wherein the two or more bend sections include a plurality of bend sections with a plurality of different bend shapes.

20. The multiplexing/demultiplexing device of claim 17, wherein the two or more bend shapes suppress inter-mode crosstalk by greater than a threshold value relative to a circular bend shape.

* * * * *